(12) United States Patent
Chen et al.

(10) Patent No.: US 7,697,417 B2
(45) Date of Patent: Apr. 13, 2010

(54) METHODS AND DEVICES FOR RE-ROUTING MPLS TRAFFIC

(75) Inventors: Feihong Chen, Lowell, MA (US); Hua Autumn Liu, Holmdel, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1325 days.

(21) Appl. No.: 10/621,324

(22) Filed: Jul. 18, 2003

(65) Prior Publication Data

US 2005/0013242 A1 Jan. 20, 2005

(51) Int. Cl.
*G01R 31/08* (2006.01)
(52) U.S. Cl. .................. 370/218; 370/223; 370/228
(58) Field of Classification Search ......... 370/221–228; 340/825.01; 398/1–5, 10, 43; 714/2–4, 25
See application file for complete search history.

(56) References Cited

U.S. PATENT DOCUMENTS

| | | | | |
|---|---|---|---|---|
| 5,838,924 | A * | 11/1998 | Anderson et al. | ............ 370/217 |
| 7,167,443 | B1 * | 1/2007 | Dantu et al. | ................. 370/228 |
| 2003/0147346 | A1 * | 8/2003 | Kanakubo | .................... 370/228 |
| 2004/0004937 | A1 * | 1/2004 | Skalecki et al. | .............. 370/227 |

* cited by examiner

*Primary Examiner*—Ian N Moore
(74) *Attorney, Agent, or Firm*—John E. Curtin

(57) ABSTRACT

Multi-Protocol Label Switched (MPLS) traffic is re-routed to an alternate, Label Switched Path (LSP) to bypass a failure along a primary LSP, even though the failure occurs at or along an ingress section of an LSP, while associating an original IP address to the alternate path. Failures are also detected farther downstream outside an ingress section. When this occurs, MPLS traffic is re-routed to an alternate LSP which maintains the same quality of service as an original primary path and includes other network devices which are not a part of the primary path (except for the network device and a destination network device). The techniques require less resources than existing techniques.

23 Claims, 6 Drawing Sheets

METHODS AND DEVICES FOR RE-ROUTING MPLS TRAFFIC

BACKGROUND OF THE INVENTION

A Multi-Protocol Label Switched (MPLS) network is a communication network made up of a plurality of network devices which transfer or forward packets of information using so-called virtual connections referred to as "label switched paths" (LSPs). Each MPLS network device may be a router, switch, or other device that is capable of processing packets in accordance with MPLS standards and the like.

A conventional LSP begins at a source network device, passes through intermediate network devices and ends at a destination network device.

If a failure at a network device or link (failure point) occurs downstream of a source network device, so-called MPLS "Fast Re-routing" is employed to bypass the failure point.

Existing MPLS Fast Re-route techniques rely on the use of MPLS forwarding tables to re-route traffic traversing a primary path to an alternate path provided a failure point does not occur at an ingress region of the primary path (i.e., along an outgoing link associated with a source network device or at a network device which neighbors the source network device, a so-called neighboring device), where such tables are of little use. Still further, there is no guarantee that the resultant alternate LSPs will have the same quality of service as an original, primary LSP.

SUMMARY OF THE INVENTION

The present invention re-routes traffic from a primary LSP to an alternative path while maintaining the same Internet Protocol (IP) address as the primary LSP even when a failure occurs at or along an ingress section of the LSP. Advantageously, less resources than existing techniques are required by making use of forwarding tables that include IP and MPLS routing information.

In one embodiment of the invention, a network device initially routes traffic along a primary path associated with an original IP address. At some point in time the device detects a failure at or along an ingress region of the path, and re-routes traffic from the primary path to an alternate path using forwarding tables which include IP and MPLS routing information while associating the original IP address to the alternate path. Once the failure is removed or otherwise corrected, the device allows traffic to once again travel along the original primary path.

In another embodiment of the invention, a network device receives a failure message from another device that has detected a failure which is not along an ingress section. Upon receiving the message, the network device re-routes traffic from a primary path to an alternate path using forwarding tables which include IP and MPLS routing information while, again, maintaining the original IP address. In this embodiment, the alternate path maintains the same quality of service as the primary path and includes other network devices which are not a part of the primary path (except for the network device and a destination network device). As before, once the failure has been corrected, the network device allows traffic to once again travel along the original primary path.

BRIEF DESCRIPTION OF THE DRAWINGS

Illustrative embodiments of the present invention are described below in conjunction with the accompanying drawings in which.

DETAILED DESCRIPTION OF THE INVENTION

Generally, the present invention re-routes traffic around a failure using "Ingress Protection" and/or "Full LSP Backup Protection" while providing the same IP address.

Ingress Protection

Figure 1:
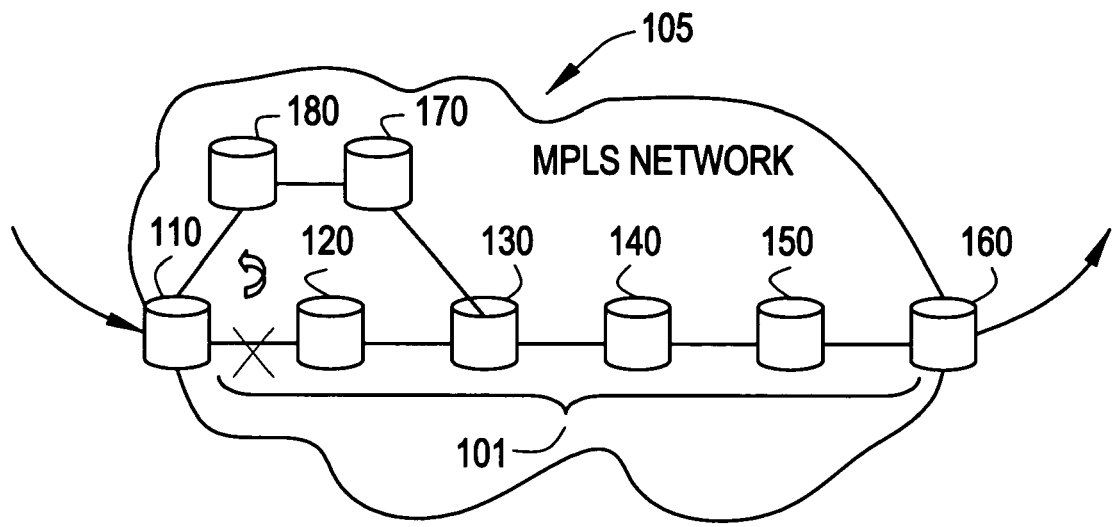
FIG. 1 is a simplified block diagram of an MPLS network which includes elements capable of re-routing traffic upon detection of a failure according to embodiments of the present invention.
Figure 2:
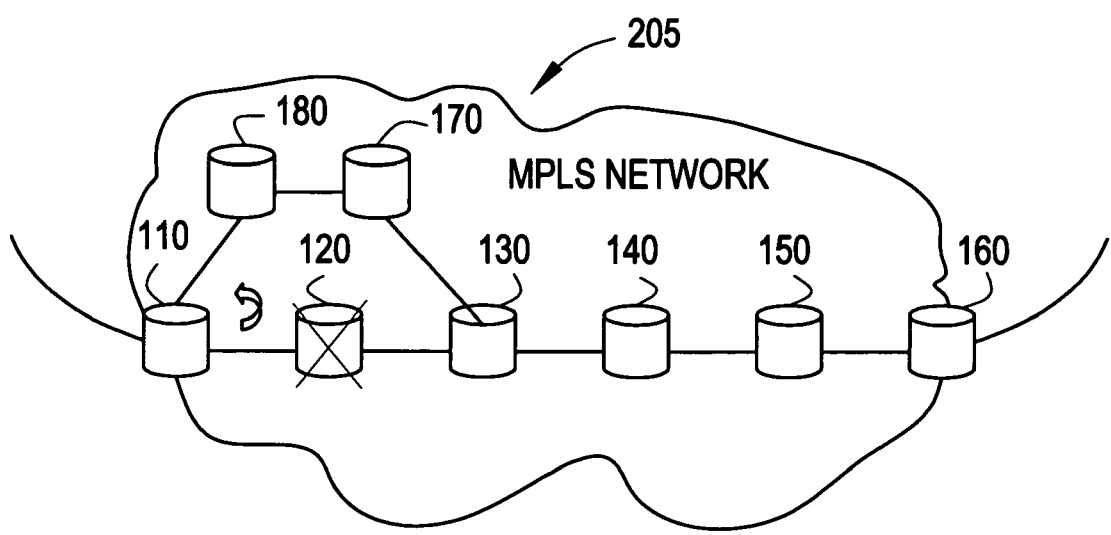
FIG. 2 is another simplified block diagram of an MPLS network which includes elements capable of re-routing traffic upon detection of a failure according to yet another embodiment of the present invention.

Ingress Protection overcomes shortcomings of MPLS Fast Re-routing by enabling the re-routing of traffic from a primary LSP if a failure point occurs in an ingress region, for example, along the link between the source network device 110 and neighboring network device 120 shown in FIG. 1 or at the neighboring network device 120 shown in FIG. 2.

FIG. 1 depicts an LSP 101 made up of network devices 110-160 (and interconnections there between) as part of an MPLS system 105.

In one embodiment of the present invention, traffic is re-routed from the primary path 110-160 to an alternate path 110, 180, 170, and 130 to bypass a failure (indicated by "X") along the primary LSP 110-160.

Source network device 110 acts as an initiating network device and is operable to route Internet Protocol (IP) packet traffic associated with an original IP address.

When the failure occurs, the initiating network device 110 either detects the failure or receives a failure message from a device located downstream, close to the failure point, X. In response to the failure, the initiating network device 110 is yet further operable to re-route traffic from the primary path to the alternate path using forwarding tables which include IP and MPLS routing information while reassociating the IP address with the alternate LSP. Reassociating the IP address improves the speed of re-routing because an IP routing table located (typically) in the initiating network device need not be modified which, in turn, reduces so-called packet loss. Once the failure has been corrected, the initiating network device 110 is further operable to allow traffic to once again travel along the original primary path 110-160.

As previously mentioned, the initiating network device 110 re-routes traffic along an alternate path upon detecting a failure or receiving a failure notification. The alternate path includes network devices and links that are not a part of the original primary path, with the exception of the starting and ending devices of the alternate LSP. This allows packets to bypass failed links and network devices.

FIG. 2 illustrates another type of failure which can be bypassed using the present invention. In FIG. 2, a failure is located at the neighboring network device 120, instead of along a neighboring link connecting network devices 110 and 120 as in FIG. 1. Even though the failure occurs at a neighboring network device 120, the same technique(s) described with regard to FIG. 1 above may be used to bypass such a failure.

Figure 3A:
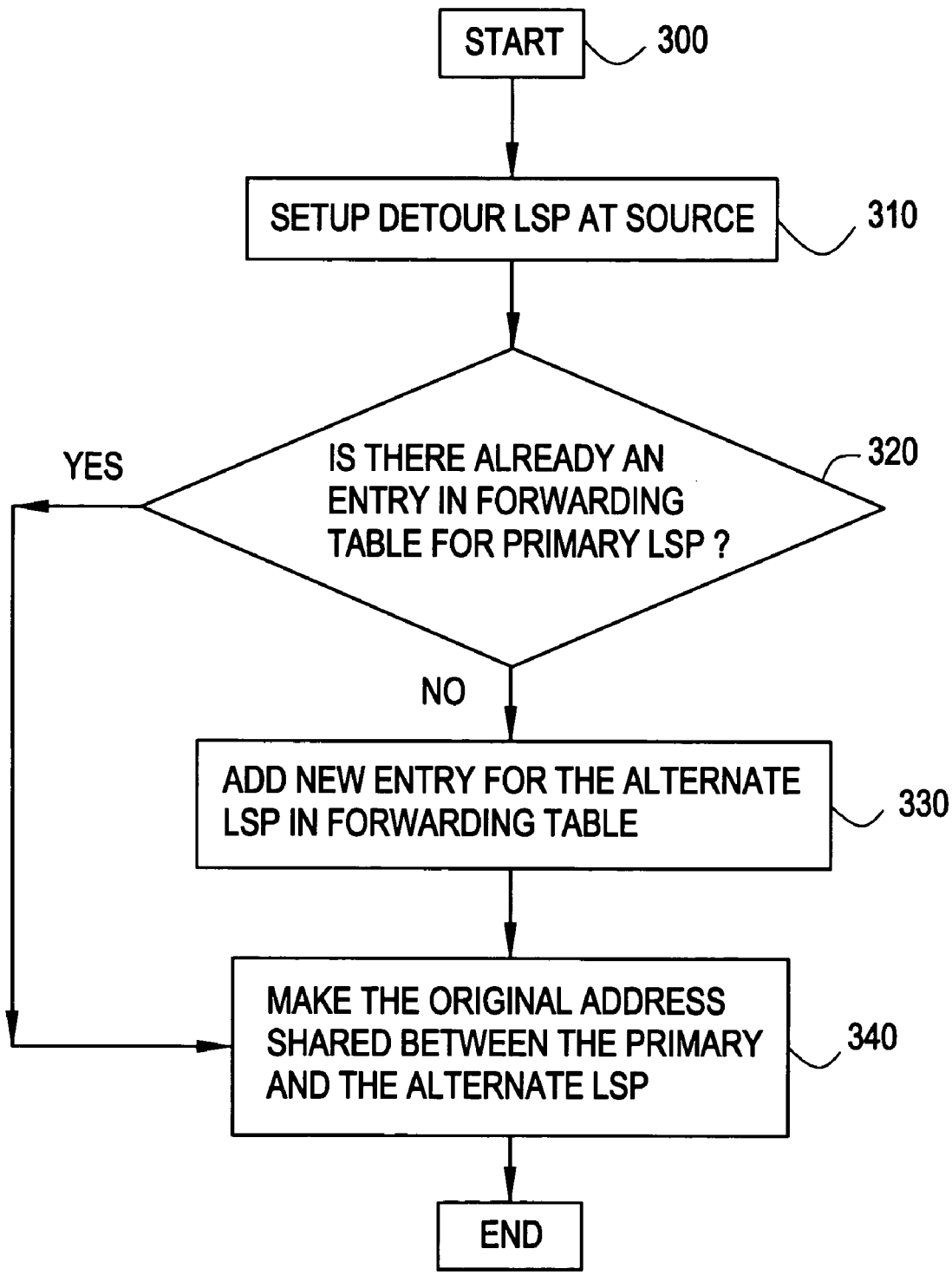
FIGS. 3A and 3B depict simplified flow diagrams of technique(s) for setting up alternate LSPs to re-route traffic upon detection of a failure according to embodiments of the present invention.
Figure 3B:
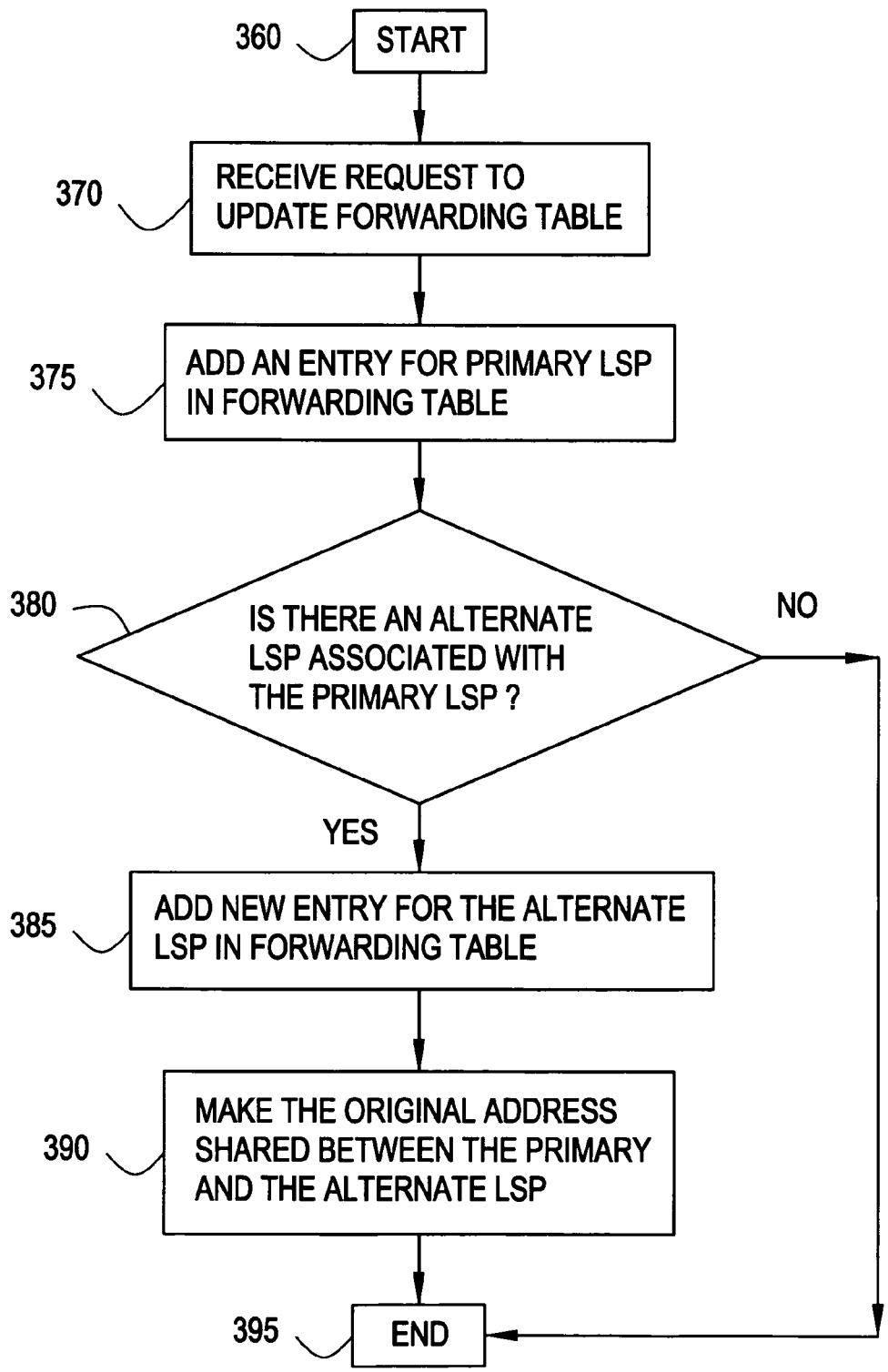

FIG. 3A shows a simplified flow diagram of a technique for setting up an alternate LSP while FIG. 3B is a simplified flow diagram of a technique for updating an IP forwarding table associated with a primary and alternate LSP according to an embodiment of the invention.

Before presenting an explanation of the technique(s) depicted in FIGS. 3A and 3B, it should be understood that these techniques may be implemented in hardware, software or firmware (e.g., by programming a control processing section of an initiating network device like network device 110) or in some combination of the three.

Beginning with FIG. 3A, step 310, a control processing section or the like is operable to setup an alternate LSP. In the present example, the initiating network device is the source network device 110. After setting up the alternate path, forwarding information must be added to an IP forwarding table. If there exists a forwarding entry for the primary LSP, the same information is again used as an entry for the alternative LSP. Creating and maintaining the IP forwarding table is the responsibility of the control processing section. Updating the IP forwarding table allows the alternate and primary LSPs to share the same address (e.g., IP address) so that an address reassociation may occur between the two when traffic switched from one or the other. More specifically, in step 320, the control processing section is operable to determine whether there is an entry in a forwarding table for a primary LSP. If not, the processing continues to step 340. If so, processing continues to step 330 where a new table entry is added for an alternate LSP. Next, in step 340, the control processing section is further operable to associate the original address to the primary LSP and the alternate LSP.

Referring now to FIG. 3B, step 370, a request is locally generated in the initiating network device, and is received by a forwarding section to update an IP forwarding table. After the request has been received, an entry associated with an LSP is added to the forwarding table, step 375. In step 380, the processing section reviews the entries in the forwarding table to determine if there is an alternate LSP associated with the primary LSP. If there isn't, the process continues to step 395. If there is, a new alternate LSP entry is added to the forwarding table in step 385. The process continues to step 390 where the processing section is operable to associate the original address with both the primary and alternate LSP. Once the original address is shared, the process ends at step 395.

The examples accompanying FIGS. 1-3A and B, depict the creation and use of a so-called "detour" alternate path. However, an "end-to-end" alternate path may alternatively be created, as described below.

Full LSP Backup Protection

Full LSP Backup Protection involves setting up an end-to-end alternate LSP, detecting a failure, and switching traffic to the end-to-end alternate LSP. Unlike detour alternate paths used in Ingress Protection, end-to-end alternate LSPs are configured to maintain the same quality of service as a primary LSP. Full LSP Backup Protection techniques may be invoked or otherwise combined with the Ingress protection technique above.

Figure 4:
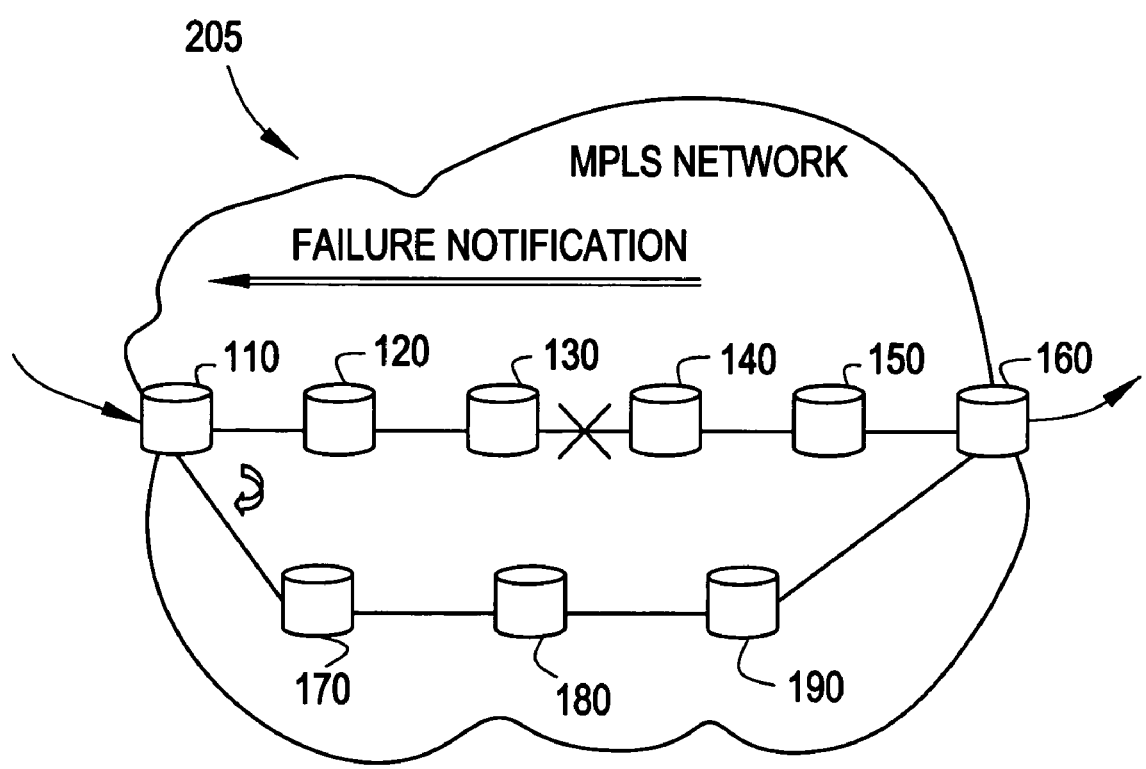
FIG. 4 is a simplified block diagram showing an MPLS network which includes elements capable of re-routing traffic upon detection of a failure in accordance with techniques envisioned by the present invention.

FIG. 4 is a simplified block diagram of a MPLS network 205 configured to support Full LSP Backup Protection techniques according to an embodiment of the invention.

In the example shown in FIG. 4, a failure occurs along a primary path, between the network devices 130 and 140. In this case, a network device close to the failure (e.g., network device 130) is operable to detect the failure. Upon detecting the failure device 130 is further operable to send a failure notification message or the like to the source network device 110 which is acting as an initiating device. Upon receiving the message, the initiating network device 110 is operable to re-route traffic from the primary path to an end-to-end alternate path 110,170,180,190 and 160 while reassociating the original IP address to the alternate path.

With the exception of the source network device 110 and destination network device 160, none of the intermediate network devices 120-150 from the original primary path are used in the end-to-end alternate path. Such a path can be referred to as a "disjointed" path.

As their name implies, end-to-end alternate paths provide end-to-end protection against failure and help to preserve the same quality of service associated with the primary LSP. Compared to MPLS Fast Re-routing, end-to-end alternate LSPs provide several advantages including those now described.

MPLS Fast Re-routing can be inefficient. For example, MPLS Fast Re-routing creates multiple, alternate paths when there are multiple failures along a primary LSP. This takes up a lot of resources. Moreover, to prepare in advance for a failure along a primary path, MPLS Fast Re-routing presets multiple, overlapping alternate paths to protect against any failure on the primary path. This, too, takes up a lot of resources. Full LSP Backup Protection, on the other hand, sets up single end-to-end alternate paths that are disjoint from the primary path. By bypassing all intermediate network devices in the primary path, only one alternate path is needed when one or multiple failure points occur, thus minimizing the amount of resources used.

MPLS Fast Re-routing is also deficient because it does not ensure that the quality of service associated with a primary LSP is maintained by an alternate LSP. Full LSP Backup Protection techniques, on the other hand, use end-to-end alternate LSPs that maintain the same quality of service as the primary path. To help maintain the quality of service, a control processing section or the like configures end-to-end alternate LSPs which only include network devices that can maintain the same quality of service required by the primary LSP for which the end-to-end alternate LSP is being used as a backup LSP. The quality of service may be related to a service's desired bandwidth, delay, delay jitter, packet loss rate, and the like.

In addition to providing the above advantages, devices implementing Full LSP Backup Protection can be configured to allow traffic to once again travel along a primary path once a failure has been corrected. This allows resources to be freed up so they can be used in another end-to-end alternate path.

In a further embodiment of the invention, each of the network devices in FIG. 4 may be operable to send a failure message back to a source network device.

Figure 5:
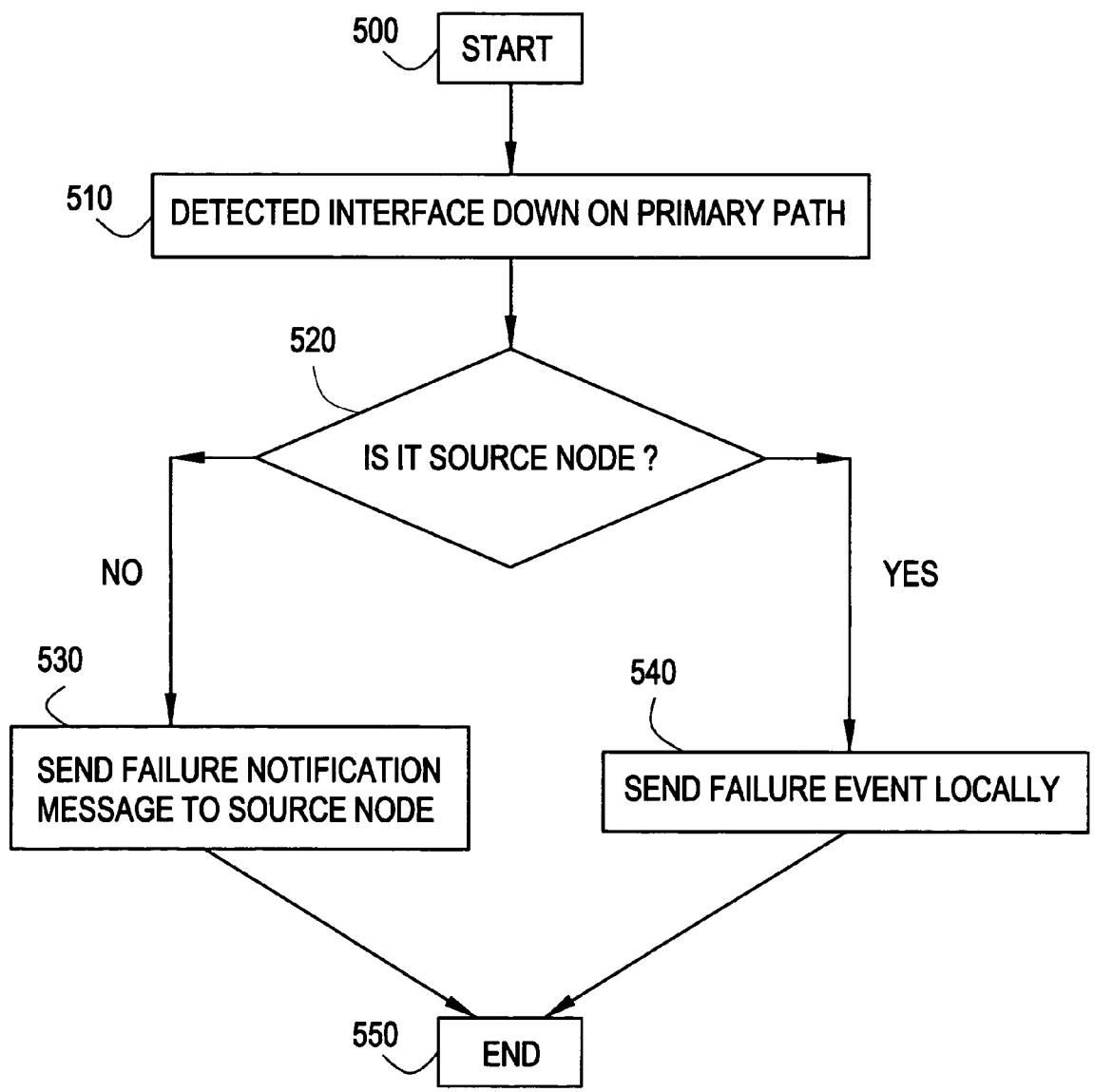
FIG. 5 is a simplified flow diagram depicting the detection of a failure and the sending of a failure notification according to yet another embodiment of the present invention.

FIG. 5 depicts a flow diagram of some aspects of a Full LSP Backup Protection technique in greater detail. It should be understood that such techniques may, for example, be implemented in hardware, software, firmware or some combination of the three in a control processing section or the like of an intermediate network device (e.g., device 130) located close to a failure point. Beginning with step 510 the control processing section is operable to detect a failure along a link or interface making up a part of a primary path. At step 520, the control processing section is operable to determine whether it is a part of a source network device or an intermediate network device. If the control processing section is a part of (or co-located with) a source network device, the failure event is sent locally, the current process ends (step 550), and the process of FIG. 6 begins. If the control processing section is not a part of a source network device for the given primary path, the control processing section is further operable to generate a failure message and to send it on to a source network device. At this point, the current process ends (step 550) and the process depicted by the techniques shown in FIG. 6 are begun.

Figure 6:
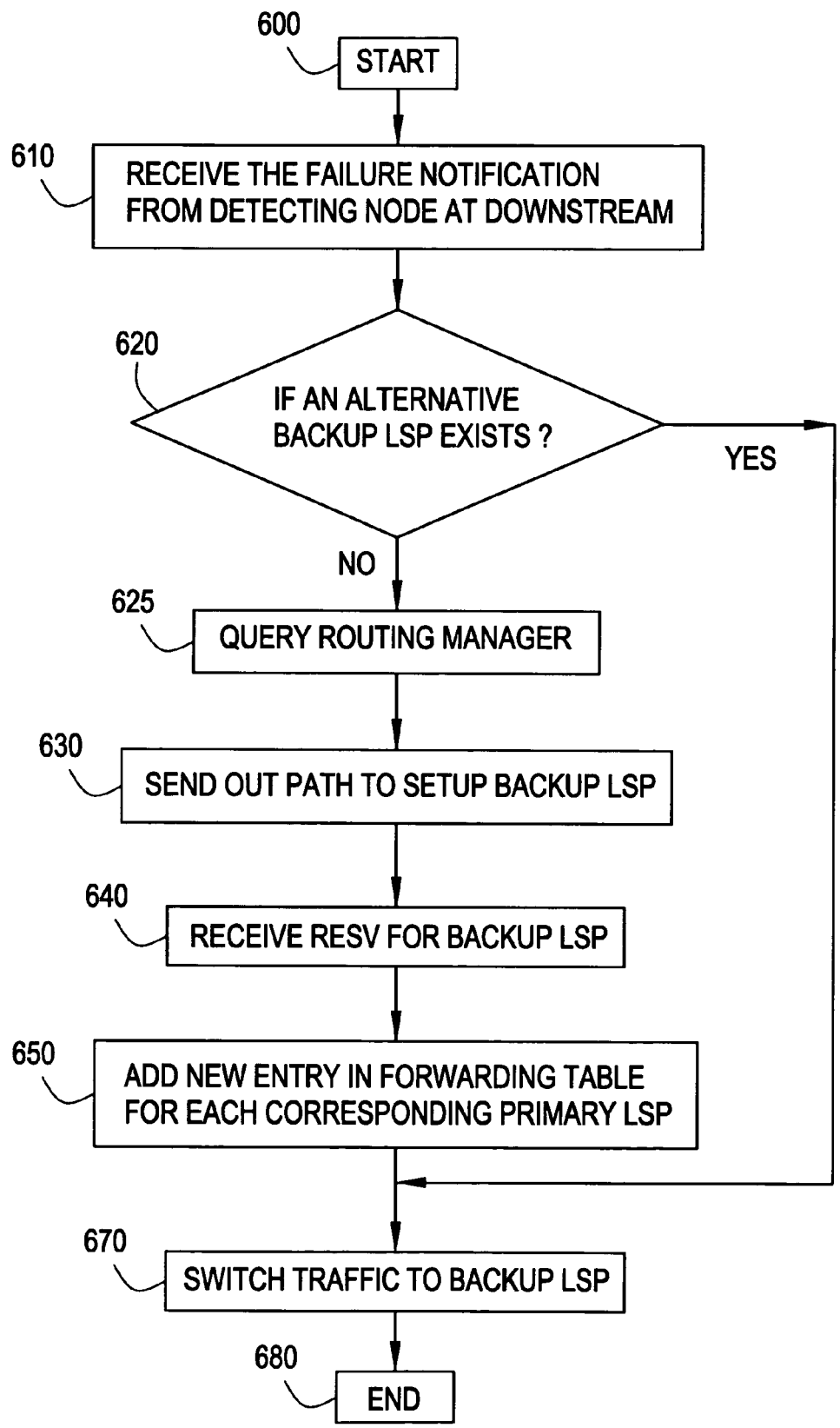
FIG. 6 is a simplified flow diagram depicting the re-routing MPLS traffic upon receiving a failure notification according to yet another embodiment of the present invention.

Referring now to FIG. 6, there is shown another simplified flow diagram of a Full LSP Backup Protection technique of the present invention. As before, the steps shown in FIG. 6 may be implemented in hardware, software, firmware, or some combination of the three, for example, in a control processing section of a source network device. Beginning at step 610, a control processing section is operable to receive a failure message from a downstream network device local to the failure point. The failure message is used by the control processing section to determine whether a failure is present. The control processing section is then operable to determine if an alternate LSP path exists by checking the state of the alternate network devices at step 620. If an alternate LSP does exist processing continues to step 670. If an alternate LSP does not exist, a routing manager is queried to identify an end-to-end alternate LSP. The routing manager is operable to determine an end-to-end alternate LSP disjoint from the primary LSP with the same quality of service as the primary LSP. Once an end-to-end alternate LSP has been identified, the control processing section is operable to send a path message to downstream network devices in the alternate LSP to set up the end-to-end alternate LSP (step 630). The path message includes quality of service information and alternate LSP information. When the control processing section of the source network device 110 receives a confirmation message, e.g., RESV message used in ReSerVation Protocol—Traffic Engineer (RSVP-TE) signaling, from the downstream network devices in the end-to-end alternate LSP (step 640), the control processing section is operable to add a new entry in a forwarding table corresponding to the primary LSP, step 650. Once the entry has been added, traffic is then switched to the alternate LSP (step 670), and the process ends (step 680).

As indicated above, a control processing section or the like may be used to implement the embodiments discussed above. The control processing section may be implemented using hardware, software, firmware, or some combination of the three. In one embodiment of the present invention, a control processing section is operable to send and receive MPLS traffic to and from MPLS network devices. In addition to the functions already described above, the control processing section is operable to add labels to MPLS packets, to set up traffic paths or to update routing information for an MPLS network, and to monitor traffic paths to determine if a failure has occurred. The control processing section may be implemented on several platforms and may comprise one or more of the following: an MPLS module, routing manager, RSVP-TE module, a link manager, and a connection manager operable to carry out the functions described throughout this description.

It has been noted that the embodiments of FIGS. 1-6 may be implemented in hardware, software, firmware and the like. These implementations may comprise a combination of processor(s) and article(s) of manufacture, such as storage media and executable computer program(s), for example. The executable computer program(s) may comprise instructions to perform the above described functions and operations. The computer executable program(s) may also be provided by, or as a part of, an externally supplied propagated signal(s) either with or without a carrier wave(s).

The discussion above describes various exemplary embodiments of the present invention. Variations of the examples given above may be derived without departing from the spirit or scope of he present invention. For example, Ingress Protection techniques may be combined with Full LSP Backup Protection techniques to re-route MPLS traffic. It is next to impossible, however, to present each and every possible variation or example of the present invention. Rather, the scope of the invention is determined by the claims which follow. The following claims should be accorded the broadest interpretations possible to cover any modifications or equivalent structures while at the same time retaining the claimed inventions validity.

What is claimed is:

1. A network device, wherein the device:
   detects a failure along an ingress region of a primary path;
   re-routes traffic from the primary path associated with an original Internet Protocol (IP) address to an alternate path which includes the device using a forwarding table that includes IP and Multi-Protocol Label Switched (MPLS) routing information while associating the original IP address to the alternate path upon detection of the failure; and
   allows traffic to travel along the primary path when the failure is no longer detected along the ingress region.

2. The device of claim 1 wherein, the device is a multi-protocol label switched (MPLS) device and the primary and alternate paths are label switched paths (LSPs).

3. The device of claim 1 wherein the failure is at a neighboring network device or along a link between the device and the neighboring network device.

4. A network device, wherein the device:
   receives a failure message;
   re-routes traffic from a primary path associated with an original IP address to an alternate path using a forwarding table that includes IP and MPLS routing information, said rerouting maintaining the original address, the alternate path comprising devices which maintain a same quality of service as the primary path and are not a part of the primary path except for the network device and a destination network device; and
   allows traffic to travel along the primary path when the failure is no longer detected.

5. The device of claim 4 wherein, the network device is a MPLS device and the primary and alternate paths are LSPs.

6. The device of claim 4 wherein, the quality of service is associated with at least one of the set consisting of bandwidth, delay, delay jitter, and packet loss rate.

7. A method for re-routing traffic comprising the steps of:
   detecting a failure along an ingress region of a primary path;
   re-routing traffic from the primary path associated with an original IP address to an alternate path which includes a source device using a forwarding table that includes IP and MPLS routing information while associating the original address to the alternate path upon detection of the failure; and
   allowing traffic to travel along the primary path when the failure is no longer detected along the ingress region.

8. The method of claim 7 wherein the primary and alternate paths are LSPs.

9. The method as in claim 7 wherein the failure is at a neighboring network device or along a link between the initiating device and the neighboring network device.

10. A method for re-routing traffic comprising the steps of:
receiving a failure message;
after said receiving step, re-routing traffic from a primary path associated with an original IP address to an alternate path using a forwarding table that include IP and MPLS routing information, said rerouting maintaining the original address, the alternate path comprising devices which maintain a same quality of service as the primary path and are not a part of the primary path except for an initiating network device and a destination network device; and
allowing traffic to travel along the primary path when the failure is no longer detected.

11. The method of claim 10 wherein the primary and alternate paths are LSPs.

12. The method of claim 10 wherein, the quality of service is associated with at least one of the set consisting of bandwidth, delay, delay jitter, and packet loss rate.

13. A network device comprising:
means for detecting a failure along an ingress region of a primary path;
means for re-routing traffic from the primary path associated with an original IP address to an alternate path which includes the device using a forwarding table that includes Internet Protocol (IP) and Multi-Protocol Label Switched (MPLS) routing information while associating the original IP address to the alternate path upon detection of the failure; and
means for allowing traffic to travel along the primary path when the failure is no longer detected along the ingress region.

14. The device of claim 13 wherein the device is a MPLS device and the primary and alternate paths are LSPs.

15. The device of claim 13 wherein the failure is at a neighboring network device or along a link between the device and the neighboring network device.

16. A network device comprising:
means for receiving a failure message;
means for re-routing traffic from a primary path associated with an original IP address to an alternate path using a forwarding table that includes IP and MPLS routing information, said means for re-routing maintaining the original address, the alternate path comprising devices which maintain a same quality of service as the primary path and are not a part of the primary path except for the network device and a destination network device; and
means for allowing traffic to travel along the primary path when the failure is no longer detected.

17. The device of claim 16 wherein, the network device is a MPLS device and the primary and alternate paths are LSPs.

18. The device of claim 16 wherein, the quality of service is associated with at least one of the set consisting of bandwidth, delay, delay jitter, and packet loss rate.

19. A source network device, wherein the device:
detects a failure along an ingress region of a primary path, where the ingress region comprises a link associated with the source network device;
re-routes traffic from the primary path associated with an original Internet Protocol (IP) address to an alternate path which includes the device using a forwarding table that includes IP and Multi-Protocol Label Switched (MPLS) routing information while associating the original IP address to the alternate path upon detection of the failure; and
allows traffic to travel along the primary path when the failure is no longer detected along the ingress region.

20. The device of claim 19 wherein, the device is a multi-protocol label switched (MPLS) device and the primary and alternate paths are label switched paths (LSPs).

21. The device of claim 19 wherein the link associated with the source network device is an outgoing link or a link between the source network device and a neighboring network device.

22. A source network device, wherein the device:
detects a failure along an ingress region of a primary path, where the ingress region comprises a link associated with the source network device, and the link comprises either an outgoing link or a link between the source network device and a neighboring network device;
re-routes traffic from the primary path associated with an original Internet Protocol (IP) address to an alternate path which includes the device using a forwarding table that includes IP and Multi-Protocol Label Switched (MPLS) routing information while associating the original IP address to the alternate path upon detection of the failure; and
allows traffic to travel along the primary path when the failure is no longer detected along the ingress region.

23. The device of claim 22 wherein, the device is a multi-protocol label switched (MPLS) device and the primary and alternate paths are label switched paths (LSPs).

* * * * *